United States Patent
Ortiz et al.

(10) Patent No.: US 11,702,505 B2
(45) Date of Patent: Jul. 18, 2023

(54) PROCESS FOR THE PRODUCTION OF EPOXY RESINS

(71) Applicant: VITO NV, Mol (BE)

(72) Inventors: Pablo Ortiz, Mol (BE); Richard Vendamme, Mol (BE)

(73) Assignee: VITO NV, Mol (BE)

( * ) Notice: Subject to any disclaimer, the term of this patent is extended or adjusted under 35 U.S.C. 154(b) by 0 days.

(21) Appl. No.: 17/282,179

(22) PCT Filed: Sep. 18, 2019

(86) PCT No.: PCT/EP2019/075067
§ 371 (c)(1),
(2) Date: Apr. 1, 2021

(87) PCT Pub. No.: WO2020/069871
PCT Pub. Date: Apr. 9, 2020

(65) Prior Publication Data
US 2022/0002473 A1   Jan. 6, 2022

(30) Foreign Application Priority Data
Oct. 2, 2018 (EP) .................................. 18198380

(51) Int. Cl.
*C08G 59/62* (2006.01)
*C08G 59/32* (2006.01)
*C08G 59/42* (2006.01)
*C08G 59/50* (2006.01)
*C08G 59/68* (2006.01)

(52) U.S. Cl.
CPC ........... *C08G 59/621* (2013.01); *C08G 59/32* (2013.01); *C08G 59/4284* (2013.01); *C08G 59/50* (2013.01); *C08G 59/686* (2013.01)

(58) Field of Classification Search
CPC .................................................. C08G 59/621
See application file for complete search history.

(56) References Cited

U.S. PATENT DOCUMENTS

| | | | |
|---|---|---|---|
| 3,857,830 A | 12/1974 | Briggs | |
| 2005/0119371 A1 | 6/2005 | Drzal et al. | |
| 2007/0287640 A1* | 12/2007 | Ballard | C09K 8/32 507/219 |
| 2009/0281273 A1 | 11/2009 | Kurata | |
| 2012/0148740 A1* | 6/2012 | Yang | C08G 59/027 427/240 |
| 2014/0083636 A1* | 3/2014 | Habas | D21H 17/53 162/164.3 |
| 2014/0235811 A1 | 8/2014 | Yang et al. | |
| 2016/0102170 A1 | 4/2016 | Sheen et al. | |

FOREIGN PATENT DOCUMENTS

| | | |
|---|---|---|
| GB | 930990 | 7/1963 |
| JP | 2009046646 A1 | 9/2007 |
| JP | 2014136741 | 7/2014 |
| WO | 2011097484 A1 | 8/2011 |
| WO | 2016164869 A2 | 10/2016 |

OTHER PUBLICATIONS

International Search Report and Written Opinion of the International Searching Authority from the European Patent Office, in PCT/EP2019/075067 dated Nov. 11, 2019, which is an international application corresponding to this U.S. application.

T. Tsujimoto, et al.; "Network Polymers from Expoxidized Soybean Oil and Bio-based Phenolic Polymers"; https://www.istage.jst.go.jp/article/networkpolymer1996/29/4/29_192/_pdf/-char/en; vol. 29, No. 4; Jul. 4, 2008.

* cited by examiner

*Primary Examiner* — Megan McCulley
(74) *Attorney, Agent, or Firm* — Koiitch Romano Dascenzo Gates LLC

(57) ABSTRACT

A process is disclosed for the production of an epoxy resin. This process includes providing lignin, one or more acids and/or esters derived from epoxidized vegetable oil(s), optionally a solvent and optionally a catalyst, to form a reactive mixture. The reactive mixture is mixed and cured in the presence of a curing agent to form the epoxy resin.

20 Claims, No Drawings

PROCESS FOR THE PRODUCTION OF EPOXY RESINS

FIELD

The present disclosure is directed to a process for the production of epoxy resins.

INTRODUCTION

Epoxy resins are thermosetting resins. Epoxy resins are high-performance resins due to their excellent mechanical properties, resistance to chemical degradation, good electrical properties and low absorption of moisture. Currently, most epoxy resins are derived from non-renewable resources. The main epoxy source is the diglycidyl ether of bisphenol A which is industrially produced by reacting epichlorohydrin with Bisphenol A (BPA). Aromatic rings from BPA impart structural rigidity and stability to the polymers, resulting in materials with good mechanical and thermal properties. Due to the good thermal properties BPA is present in more than 90% of the epoxy polymers. However, it is under great regulatory pressure due to its endocrine-disrupting effect. In the current commercial processes also epichlorohydrin is used, which is a carcinogenic chemical. Hence, there is an urge to find a replacement for BPA and epichlorohydrin.

Moreover, environmental concerns and the depletion of fossil fuels are pushing the chemical industry to move towards the use of renewable resources.

The prior art comprises several processes wherein lignin is used to prepare epoxy polymers.

U.S. Pat. No. 3,857,830 describes epoxide compositions wherein lignin is cross-linked with di-epoxide compounds. The di-epoxide compounds have terminal epoxide groups and are not derived from biomass.

GB930990A describes the reaction of lignin with a polyepoxide, and the resulted resin can be further cured with anhydrides or diamines. The polyepoxides employed are produced by a reaction of a polyhydroxy compound with epichlorohydrin. The polyepoxides are not derived from biorenewable sources.

In US20140235811A1 describes methods for manufacturing bio-based epoxy resins. A lignin compound is first reacted with a polyol to form an intermediate product. Thereafter, the intermediate product is reacted with a multi-epoxy compound.

US20160102170A1 describes a method of forming a lignin-based biomass epoxy resin, which includes: (a) mixing a lignin, an acid anhydride compound, and a solvent to react for forming a first intermediate product, (b) reacting the first intermediate compound with a first polyol to form a second intermediate compound, and (c) reacting the second intermediate compound with an epoxy compound to form a bio-based epoxy resin.

Other patent publications describe the use of epoxidized vegetable oils and their derivatives in epoxy resins.

US20050119371A1 describes curing of an epoxidized vegetable oil or its ester with an epoxy resin precursor. The cured composition preferably includes a filler and/or continuous carbon fibers, but no lignin is present.

Similarly, WO2016164869A2 describes the use of epoxidized triglycerides and their reaction with an epoxy-reactive compound to lead to triglyceride-acetoacetyl composition.

In a research paper (T. Tsujimoto, N. Imai, H. Kageyama, H. Uyama, M. Funaoka, J-STAGE, 2008, 4, p. 192-197) the reaction between lignophenol and epoxidized soybean oil is described, using a catalyst. In the paper is described that the lignin did not impart any reinforcement to the polymer formed, which means that no reaction between lignophenol and the epoxidized soybean oil was observed.

US2009281273A1 discloses a process for making a polymeric material by mixing lignin with an epoxidized linseed oil by a ratio of epoxy equivalent of the epoxy resin: hydroxyl equivalent of the lignin is 1:1.

JP2009046646A discloses in an example a process to produce an epoxy resin composed by lignin sulfonate and epoxidized linseed oil. In this process a catalyst is used.

JP2014136741A discloses an example to prepare an epoxy resin that comprises a lignin derivative, epoxidized linseed oil, hexamethylenetetramine 2-methylimidazole as the catalyst and silica powder.

DETAILED DESCRIPTION

The object of the present disclosure is to provide partially or fully bio-based epoxy resins which are easy to produce. The process for the production of epoxy resins according to the present disclosure comprises the following steps:
  a. Providing lignin, one or more acids and/or one or more esters derived from epoxidized vegetable oil(s), optionally a solvent and optionally a catalyst to form a reactive mixture,
  b. Mixing and curing the reactive mixture in the presence of a curing agent to form the epoxy resin.

In particular the process for the production of epoxy resins according to the present disclosure comprises the following steps:
  a. Providing lignin, one or more esters derived from epoxidized vegetable oil(s), optionally a solvent and optionally a catalyst to form a reactive mixture,
  b. Mixing and curing the reactive mixture in the presence of a curing agent to form the epoxy resin.

The processes according to the present disclosure have the following advantages:

The lignin and the epoxidized vegetable oil-based acids or esters are derived from bio-based sources. Also the curing agent and the solvent can be obtained from bio-based sources. In this way a fully bio-based epoxy resin can be produced. Further, the process according to the present disclosure can be performed as a single step process or a two-step process which makes it an economically attractive process. Moreover, the properties of the epoxy resin can be adapted by the variation of the type of the epoxidized vegetable oil-based acid or ester, the amount of lignin to the epoxidized vegetable oil-based acid or ester, and the variation of the amount of curing agent to the epoxidized vegetable oil-based acid or ester. If a solvent is used, the solvent preferably is not incorporated in the epoxy resin and the solvent can be reused.

The process for the production of an epoxy resin according to the present disclosure comprises the following steps:
  a. Providing lignin, one or more acids and/or one or more esters derived from epoxidized vegetable oil(s), optionally a solvent and optionally a catalyst to form a reactive mixture,
  b. Mixing and curing the reactive mixture in the presence of a curing agent to form the epoxy resin.

According to a first embodiment an epoxy resin can be produced in a single reaction step. When the epoxy resin is produced in a single reaction step, step b comprises:
  b.i. Mixing the reactive mixture in the presence of a curing agent and
  b.ii Curing the reactive mixture to form the epoxy resin.

In another embodiment it is possible to produce the epoxy resin in a two-step process, wherein step b comprises:
- b.i. Mixing the reactive mixture at a temperature of at least 20° C. for at least 5 minutes and
- b.ii. Curing the reactive mixture in the presence of a curing agent to form the epoxy resin.

During mixing step b.i. an intermediate product can be formed.

Further, after performing the mixing step b.i. and before curing the reactive mixture, additional epoxidized vegetable oils and/or a second epoxy compound can be added to the reactive mixture and/or the intermediate product; in particular additional acids and/or esters derived from epoxidized vegetable oils, and/or a second epoxy compound can be added to the reactive mixture and/or the intermediate product; more in particular additional esters derived from epoxidized vegetable oils, and/or a second epoxy compound can be added to the reactive mixture and/or the intermediate product.

During curing the hydroxyl groups in the lignin react with the epoxy groups of the acids and/or esters derived from epoxidized vegetable oil. The reaction between lignin and the acids and/or esters derived from epoxidized vegetable oil can be confirmed by FTIR spectroscopy, as the signal corresponding to the epoxy group in the product decreases.

In order to incorporate lignin in the epoxy resin, lignin has to react with the one or more acids and/or esters derived from epoxidized vegetable oil before the curing agent. There are different ways in which this can be achieved.

A two-step reaction can be performed to ensure that the lignin reacts with the one or more acids and/or esters derived from epoxidized vegetable oil in the first step. In the second step the intermediate product is cured.

A one-step reaction is also possible, but in this case the reaction of lignin with the acids and/or esters derived from epoxidized vegetable oil has to be faster than the reaction of the curing agent with the epoxidized vegetable oil. A curing agent should be selected that allows the reaction between lignin and the acids and/or esters derived from epoxidized vegetable oil.

A solvent is required if the lignin and/or the catalyst are not soluble in the acids and/or esters derived from epoxidized vegetable oil. It is important that the lignin is soluble in the acids and/or esters derived from epoxidized vegetable oil. If not, the lignin will not react with the acids and/or esters derived from epoxidized vegetable oil and the cross-linked material formed after curing will incorporate lignin just as a filler.

As will become evident from the examples hereinafter, in a particular embodiment esters derived from epoxidized vegetable oils are used in the process(es) herein disclosed.

The reaction mixture is, preferably, stirred at a temperature of at least 10° C., more preferably at least 20° C., most preferably at least 30° C., alternatively at least 40° C. The temperature is preferably at most 200° C., more preferably at most 150° C., most preferably at most 100°. The reaction mixture is preferably stirred for at least 1 minute, preferably for at least 5 minutes, preferably for at least 10 minutes, preferably for at least 30 minutes. The reaction mixture is preferably stirred for at most 5 hours, more preferably for at most 2 hours, most preferably for at most 1 hour.

Temperatures that are too low or a short reaction time might lead to an incomplete reaction between lignin and the one or more acids and/or esters derived from epoxidized vegetable oil.

The solvent, if present, might be evaporated during or after mixing but before the addition of the curing agent, after the addition of the curing agent but before the curing or during the curing.

The curing time preferably is at least 1 hour, more preferably 2 hours, most preferably 3 hours.

The curing time preferably is at most 48 hours, more preferably 36 hours, most preferably 24 hours. The curing temperature is preferably at least 50° C., more preferably at least 80° C., most preferably at least 100° C. The curing temperature is preferably at most 250° C., more preferably at most 200° C., most preferably at most 180° C.

Preferably, the weight ratio of lignin to the one or more acids and/or esters derived from epoxidized vegetable oil is 0.01:1 to 5:1; more preferably 0.05:1 to 1:1. More preferably the weight ratio of lignin to esters derived from epoxidized vegetable oil is 0.01:1 to 5:1; more preferably 0.05:1 to 1:1.

This ensures that enough reactive sites are available for the reaction of the curing agent.

In a further embodiment lignin can be mixed with acids and/or esters, in particular esters derived from epoxidized vegetable oil in a weight ratio of 0.5:1 to 5:1. Before curing additional epoxidized vegetable oil can be added. If the acids and/or esters derived from epoxidized vegetable oil reacts with the lignin in the first step, the additional epoxidized vegetable oil will not react with lignin. The intermediate product and the additional epoxidized vegetable oil will be cured by the curing agent to form the epoxy resin. In a particular embodiment additional acids and/or esters, preferably esters, derived from epoxidized vegetable oil can be added before curing. If the acids and/or esters derived from epoxidized vegetable oil react with the lignin in the first step, the additional acids and/or esters derived from epoxidized vegetable oil will not react with lignin. The intermediate product and the additional acids and/or esters derived from epoxidized vegetable oil will be cured by the curing agent to form the epoxy resin.

Preferably, in the process of the present disclosure the curing agent and the solvent are bio-based.

Lignin is the second most abundant natural polymer on earth, accounting for 15-30% of the earth's biomass. Native lignins are complex aromatic polymers resulting from the radical polymerization of three aromatic alcohols: p-coumaryl, coniferyl, and sinapyl alcohols, in proportions which are dictated by the type of lignocellulosic species. These monolignol units are linked together by different bonding motifs, with β-O-4 ether linkages being the predominant. Lignin is the only scalable source of renewable aromatic compounds, but currently only a tiny fraction of it is used in specialty products.

Lignin has not a defined structure, and moreover, this is dependent on the isolation and post-treatment process. However, it has a repeating unit derived from the monomers that it is synthesized from:

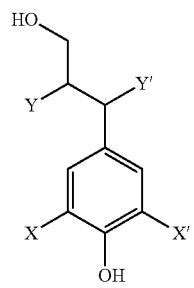

X = H or OCH$_3$
X' = H or OCH$_3$
Y = H, OSO$_3$M or SH
Y' = H, OSO$_3$M or SH
M = Alkaline metal Regardless of the lignin source and treatment, lignin will have a certain amount of hydroxyl functional groups, both aliphatic and aromatic. Chemical modifications might be performed on lignin to enhance its reactivity. These include but are not limited to esterification, demethylation, phenolation and methylolation.

Lignin needs to be isolated from the lignocellulose material. Fractionated lignins derived from alkaline delignification (such as the Kraft process, soda pulping and sulfite pulping), acid deligninfication (such as organosolv pulping and formaldehyde-assisted fractionation), reductive catalytic fractionation, ionic liquid dissolution and ionosolv pulping fractionation can be used. In addition, lignins resulting from biomass fractionation methods can be used. These methods include acid catalyzed hydrolysis, enzyme-assisted hydrolysis and pyrolisis. Depolymerized lignin streams originating from either native or isolated lignin can be used in this process. Depolymerization techniques include reductive depolymerization, oxidative depolymerization, base-catalyzed depolymerization, acid-catalyzed depolymerization, solvolytic depolymerization, electrochemical depolymerization and thermal depolymerization.

Technical lignin or combinations thereof can be used in the process, but preferably more defined lignins, with higher functionality and lower molecular weight are used in the process. These are the result of depolymerization, fractionation or both depolymerization and fractionation prior to the reaction. Depolymerized lignins include monomers, dimers and oligomers in their composition.

Epoxidized vegetable oils are mixtures of triglycerides extracted from plants that have been epoxidized.

Non-limiting examples of epoxidized vegetable oils include epoxidized linseed oil, epoxidized soybean oil, epoxidized castor oil, epoxidized canola oil, epoxidized pongamia oil, epoxidized rapeseed oil, epoxidized sunflower oil, epoxidized neem oil, epoxidized Tung oil, epoxidized natural rubber or mixtures thereof containing at least two of these epoxidized products. Epoxidized vegetable oil can be represented by the general formula:

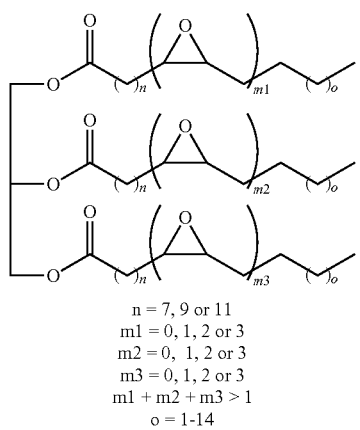

$n = 7, 9$ or $11$
$m1 = 0, 1, 2$ or $3$
$m2 = 0, 1, 2$ or $3$
$m3 = 0, 1, 2$ or $3$
$m1 + m2 + m3 > 1$
$o = 1\text{-}14$ Acids and esters of epoxidized vegetable oils can be obtained. These can be represented by the general formula:

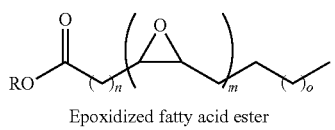

Epoxidized fatty acid ester

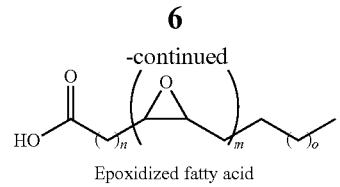

Epoxidized fatty acid $R = 1\text{-}6$ carbon atoms
$n = 7, 9$ or $11$
$m = 1, 2$ or $3$
$o = 1\text{-}14$ The R group in the ester can be any linear or branched alkyl chain of up to 6 carbon atoms. Examples of these alkyl groups are methyl, ethyl, propyl, n-butyl, t-butyl and hexyl groups. Preferably, R is a methyl group.

The use of acids and the esters of the epoxidized vegetable oils in the process according to the present disclosure gives a better performance than the corresponding triglycerides (epoxidized vegetable oils), as they allow more cross-linking in the epoxy resin.

Mixtures of acids and/or esters derived from epoxidized vegetable oils, can be used in the process according to the present disclosure. In particular mixtures of esters derived from epoxidized vegetable oils, can be used in the process according to the present disclosure.

More preferably, epoxidized linseed oil and epoxidized soybean oil combinations and acid or ester derivatives thereof are used due to their commercial availability.

The acids or esters derived from epoxidized vegetable oils, can also be used in combination with a second epoxy compound. The second epoxy compound can be added together with the acids or esters derived from epoxidized vegetable oil to tune the properties of the epoxy resin. This second epoxy compound needs to contain at least two epoxy groups. Preferably, the second epoxy compounds are bio-based. Examples of the second epoxy compound are poly-epoxides derived from polyols, such as glycerol, ethylene glycol, gallic acid and resorcinol.

The epoxy compound present can contain 10 to 100 wt % of acids and/or esters derived from epoxidized vegetable oils, and from 10 to 90 wt % of a second epoxy compound based on the total weight of the epoxy compound present.

A curing agent is used in the process for the production of an epoxy resin. Examples of the curing agent are a diamine, a polyamine, a diacid or a triacid, an anhydride, a diol or polyol and include but are not limited to: dimer diamines, which are derived from dimerized fatty acids, such as Priamine 1074 from Croda®; linear, branched or cyclic aliphatic diamines or polyamines comprising between 4 and 40 carbon atoms, such as hexamethylenediamine, diethylenetriamine, triethylenetetramine, tetraethylene pentaamine, diethylaminopropylamine, trimethyl hexamethylene diamine, hexamethylenetetramine, isophoronediamine; aromatic diamines such as m-xylenediamine and metaphenylene diamine; diacids comprising 4-40 carbon atoms such as succinic acid, glutaric acid, adipic acid, pimelic acid, suberic acid, azelaic acid, sebasic acid, dodecanoic acid, tridecanoic acid and tetradecanoic acid; triacids comprising 6 carbon atoms such as citric acid, isocitric acid, propane 1,2,3, tricarboxylic acid; dimer fatty acids such as Pripol 1009 from Croda® or Radiacid 0976 from Oleon®; mixtures of dimer and trimer fatty acids such as Pripol 1040 from Croda®; cyclic anhydrides such as succinic anhydride, maleic anhydride, itaconic anhydride, glutaric anhydride and phthalic anhydride; and diols, triols and polyols comprising 4-40 carbon atoms such as 1,4-butanediol, 1,6-hexanediol, glycerol, sucrose, tannic acid and pentaerythritol; dimer diols such as Radianol 1990 from Oleon®. Preferably, the curing agent is a bio-based curing agent.

Preferably, the ratio of curing agent to acids and/or esters derived from epoxidized vegetable oil is 0.2:1 to 5:1, more preferably 0.5:1 to 3:1, most preferably 0.75:1 to 1.5:1, calculated by amine/acid/anhydride/alcohol equivalent weight: epoxy equivalent weight.

Lower ratios might lead to insufficient cross-linking, whereas higher ratios might lead to unreacted curing agent.

Optionally a solvent is used in the process for the production of an epoxy resin.

Examples of solvents are tetrahydrofuran, 2-methyltetrahydrofuran, 1,4-dioxane, dimethylformamide, dimethylsulfoxide, toluene, acetone, ethyl acetate, dichloromethane, chloroform, methanol and ethanol. Examples of bio-based solvents are 2-methyltetrahydrofuran, methanol or ethanol. Also mixtures of solvents can be used.

The solvent, if necessary, preferably is only a reaction medium and does not get incorporated into the resin. The solvent can be re-used The solvent, if present, might be evaporated before the curing or during the curing of the epoxy resin.

Optionally a catalyst is used in the process for the production of an epoxy resin.

The use of catalyst is not necessary, but might reduce the reaction time and/or temperature of the curing. Examples of possible catalysts are: imidazoles, such as 1-methylimidazol; tertiary amines, such as trimethylamine; quaternary amines, such as tetrabutyl ammonium chloride; Lewis acids, such as p-toluensulfonic acid; or zinc chloride; titanium oxides, such as titanium isopropoxide or titanium butoxide; and zinc complexes, such as zinc acetate or zinc acetylacetonate.

The present disclosure is also directed to epoxy resins; preferably to partially or fully bio-based epoxy resins.

The composition of the epoxy resin can be tuned by changing the ratios of the different components. By doing so, epoxy resins with different properties can be obtained, from stiff and hard materials to elastic and flexible materials.

The epoxy resin can comprise additives and/or fillers. Fillers and additives can be blended with the resin before curing to attain desired properties. The filler is preferentially selected from the group of silicates, hollow glass microspheres, calcium carbonate(talc), wood flour, carbon black, graphite powder, modified clay, cotton flock, metal powders (such as aluminium trihydroxide), carbon fibers and pulp chopped fibers (such as hemp, flax, cotton and linen). Nanoscale fillers might also be incorporated in the epoxy resin. These include but are not limited to carbon nanofibers, graphene, nanoparticles, nanofibrillated cellulose, exfoliated nanographite platelets and inorganic nano-whiskers. Additives might be incorporated into the composition to achieve desired properties. Additives are preferably selected from the group of plasticizers, reactive diluents, tackifiers, stabilizers and flame-retardants.

The present disclosure is further directed to the use of the epoxy resins.

The epoxy resins can, for example, be used for the production of composites, dispersions, lamination materials, rubbery materials, fiber-reinforced materials, electronic materials, aerospace materials, biomedical applications, adhesives, paints and coatings. Preferably, the epoxy resins are used for applications wherein the bio-based content is an advantage.

It is further noted that the present disclosure relates to all possible combinations of features described herein, preferred in particular are those combinations of features that are present in the claims.

It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps.

The present disclosure will now be explained by way of the following examples without however being limited thereto.

EXAMPLES

Lignin
Kraft lignoboost lignin (Innventia institute);
Kraft lignoboost lignin, methanol extracted fraction
Kraft lignoboost lignin, acetone extracted fraction
Base-catalyzed depolymerized lignin, solvent-extracted fraction (Fraunhofer Institute)
Solvent extraction was performed by dissolving 10 g of lignin in 150 ml of solvent (methanol or acetone) and stirring overnight, centrifuging or filtering through a Butchner, and finally concentrating and drying the lignin.
Epoxidized Vegetable Oil
Epoxidized soybean oil; Efka® PL 5382 (BASF)
Epoxidized soybean oil methyl ester
Epoxidized linseed oil; Lankroflex™ L (Valtris)
Epoxidized linseed oil methyl ester
The methyl esters of epoxidized soybean oil and linseed oil can be obtained according to the procedure described in: RSC Adv., 2015, 5, p. 13674.
Curing Agent
Priamine 1074 obtained from Croda®
Radiacid 0976 obtained from Oleon®
Solvent
Tetrahdrofuran (THF) from Fisher Scientific®
Methanol from Acros Organics®
Ethanol from Acros Organics® Acetone from Acros Organics®
Catalyst
1-methylimidazol from Alfa Aesar®

Example 1

An amount of lignin (LignoBoost Kraft, methanol extracted fraction) was dissolved in 2 ml of tetrahydrofuran and mixed with 1 gram of epoxidized linseed oil methyl esters. The mixture was stirred at 70° C. for 60 minutes in an open flask. Afterward, an amount of Priamine 1074 was added, the mixture was stirred for 1 minute and poured in a Teflon mold. The Teflon mold was placed in a vacuum oven (850 mbar) at 50° C. for 60 minutes to allow the solvent to evaporate. Then the Teflon mold was placed in an oven and cured at 120° C. for 4 hours and at 150° C. for 16 h.

| Number | Amount of lignin (g) | Amount of Priamine 1074 (g) |
|---|---|---|
| 1.1 | 0.25 | 0.75 (1 equiv.) |
| 1.2 | 0.125 | 0.75 (1 equiv.) |
| 1.3 | 0.5 | 0.75 (1 equiv.) |
| 1.4 | 0.5 | 0.56 (0.75 equiv.) |

-continued

| Number | Amount of lignin (g) | Amount of Priamine 1074 (g) |
|---|---|---|
| 1.5 | 0.5 | 0.94 (1.25 equiv.) |
| 1.6 | 0.5 | 1.125 (1.5 equiv.) |

Example 2

0.5 g of lignin was dissolved in 2 ml of tetrahydrofuran and mixed with 1 gram of epoxidized vegetable oil or its derivative. The mixture was stirred at 70° C. for 60 minutes in an open flask. Afterward, 0.75 g of Priamine 1074 was added, the mixture was stirred for 1 minute and poured in a Teflon mold. The Teflon mold was placed in a vacuum oven (850 mbar) at 50° C. for 60 minutes to allow the solvent to evaporate. Then the Teflon mold was placed in an oven and cured at 120° C. for 4 hours and at 150° C. for 16 h. Example 2.2 lead to a non-homogeneous mixture after mixing and could not be cured

| Number | Lignin type | Epoxidized vegetable oil or derivative |
|---|---|---|
| 2.1 | LignoBoost Kraft | epoxidized linseed oil methyl esters |
| 2.2 | LignoBoost Kraft, methanol extracted | epoxidized linseed oil |
| 2.3 | LignoBoost Kraft, acetone extracted | epoxidized linseed oil methyl esters |
| 2.4 | LignoBoost Kraft, methanol extracted | epoxidized soybean oil methyl esters |

Example 3

This improper curing using epoxidized vegetable oils, was confirmed in a further experiment wherein 0.25 g of lignin (LignoBoost Kraft, methanol extracted fraction) was dissolved in 2 ml of tetrahydrofuran and mixed with 1 gram of epoxidized linseed oil. The mixture was stirred at 70° C. for 60 minutes in an open flask. Afterward, the curing agent (1 equiv.), and in some cases a catalyst, was added. The mixture was stirred for 1 minute and poured in a Teflon mold. The Teflon mold was placed in a vacuum oven (850 mbar) at 50° C. for 60 minutes to allow the solvent to evaporate. Then the Teflon mold was placed in an oven and cured.

| Number | Curing agent | Catalyst | Curing conditions | Material |
|---|---|---|---|---|
| 3.1 | Priamine 1074 (0.75 g) | — | 50° C. for 5 days | Not fully cured |
| 3.2 | Priamine 1074 (0.75 g) | — | 100° C. for 4 days | Cured, analogous to example 1.1 |
| 3.3 | Priamine 1074 (0.75 g) | 1-methyl-imidazol (20 µL) | 120° C. for 20 h | Cured, analogous to example 1.1 |
| 3.4 | Priamine 1074 (0.75 g) | — | 120° C. for 20 h | Not fully cured |

Example 4

0.5 g of lignin (Kraft, depolymerized by base-catalyzed depolymerization, solvent extracted fraction) was mixed with 0.5 grams of epoxidized soybean oil methyl esters. The mixture was stirred at 70° C. for 30 minutes in an open flask. Afterward, 0.3 g of Priamine 1074 was added, the mixture was stirred for 1 minute and poured in a Teflon mold. The Teflon mold was placed in a vacuum oven (850 mbar) at 50° C. for 60 minutes. Then the Teflon mold was placed in an oven and cured at 120° C. for 2 hours and at 150° C. for 16 h.

Example 5

0.25 g of lignin (LignoBoost Kraft, methanol extracted fraction) was dissolved in 2 ml of tetrahydrofuran and mixed with 1 gram of epoxidized linseed oil methyl esters and 0.75 g of Priamine 1074. The mixture was stirred for 1 minute and poured in a Teflon mold. The Teflon mold was placed in a vacuum oven (850 mbar) at 50° C. for 60 minutes to allow the solvent to evaporate. Then the Teflon mold was placed in an oven and cured at 120° C. for 4 hours and at 150° C. for 16 h. The result was analogous to example 1.1.

Example 6

0.25 g of lignin (LignoBoost Kraft, methanol extracted fraction) was mixed with 1 gram of epoxidized linseed oil methyl esters and 0.75 g of Priamine 1074. The mixture was stirred for 1 minute at 100° C. and poured in a Teflon mold. The Teflon mold was placed in an oven and cured at 120° C. for 4 hours and at 150° C. for 16 h. A sticky material was obtained, in which lignin was acting just as a filler.

Example 7

0.25 g of lignin (LignoBoost Kraft, methanol extracted fraction) was dissolved in 2 ml of ethanol and mixed with 0.5 grams of epoxidized linseed oil methyl esters. The mixture was heated up to 90° C. for 2 hours in an open flask, allowing the solvent to evaporate. Afterward, 0.5 grams of epoxidized linseed oil methyl esters and 0.75 g of Priamine 1074 were added, the mixture was stirred for 1 minute and poured in a Teflon mold. The Teflon mold was placed in an oven and cured at 120° C. for 4 hours and at 150° C. for 16 h. The result was analogous to example 1.1.

Example 8

0.25 g of lignin (LignoBoost Kraft, methanol extracted fraction) was dissolved in 2 ml of tetrahydrofuran and mixed with 1 gram of epoxidized linseed oil methyl esters. The mixture was stirred at room temperature for 30 minutes in an open flask. Afterward, 0.75 g of Priamine 1074 was added, the mixture was stirred for 1 minute and poured in a Teflon mold. The Teflon mold was placed in a vacuum oven (850 mbar) at 50° C. for 60 minutes. Then the Teflon mold was placed in an oven and cured at 120° C. for 2 hours and at 150° C. for 16 h. The result was analogous to example 1.1.

Example 9

0.25 g of lignin (LignoBoost Kraft, methanol extracted fraction) was dissolved in 2 ml of tetrahydrofuran and mixed with 1 gram of epoxidized linseed oil methyl esters. The mixture was heated up to 100° C. for 2 hours in an open flask, allowing the solvent to evaporate. Afterward, 0.75 g of Priamine 1074 was added, the mixture was stirred for 1 minute and poured in a Teflon mold. The Teflon mold was placed in an oven and cured at 120° C. for 4 hours and at 150° C. for 16 h. The result was analogous to example 1.1.

Example 10

1 gram of epoxidized linseed oil methyl esters was mixed with 0.75 g of Priamine 1074 and the mixture was stirred for 1 minute at 80° C. The mixture was poured in a Teflon mold. The Teflon mold was placed in an oven and cured at 120° C. for 4 hours and at 150° C. for 16 h. An orange, sticky, breakable and very soft material was obtained.

Example 11

0.25 g of lignin (Kraft, depolymerized by base-catalyzed depolymerization, solvent extracted fraction) was mixed with 1 gram of epoxidized soybean oil methyl esters. The mixture was stirred at 70° C. for 30 minutes in an open flask. Afterward, 0.8 g of Radiacid 0976 and 20 µL of 1-methyl-imidazol were added, the mixture was stirred for 1 minute and poured in a Teflon mold. The Teflon mold was placed in a vacuum oven (850 mbar) at 50° C. for 60 minutes. Then the Teflon mold was placed in an oven and cured at 120° C. for 2 hours and at 150° C. for 16 h.

TABLE A

Properties of epoxy resin obtained from the previous examples

| Example | Tg (° C.) | Young's Modulus (MPa) |
|---|---|---|
| 1.1 | −12 | 2.2 ± 0.4 |
| 1.2 | −20 | 0.7 ± 0.1 |
| 1.3 | 0 | 13.8 ± 1.3 |
| 1.4 | −2 | 22.1 ± 1.6 |
| 1.5 | −5 | 7.4 ± 0.4 |
| 1.6 | −6 | 4.7 ± 1.1 |
| 2.1 | 0 | 35.2 ± 9.0 |
| 2.2 | — | — |
| 2.3 | 4 | 2.2 ± 0.4 |
| 2.4 | −16 | 3.6 ± 0.7 |
| 4 | 15 | 60.2 ± 9.6 |
| 5 | −10 | 2.5 ± 0.2 |
| 10 | −20 | 0.26 ± 0.01 |
| 11 | −16 | 0.6 ± 0 |

The invention claimed is:

1. A process for the production of an epoxy resin, the process comprising the following steps:
   (a) directly mixing lignin and one or a combination of: one or more acids derived from epoxidized vegetable oil(s) and one or more esters derived from epoxidized vegetable oil(s) to form a reactive mixture; and
   (b) mixing and curing the reactive mixture in the presence of a curing agent to form the epoxy resin;
   wherein an intermediate product is formed during step (a), and the intermediate product is cured in response to the reactive mixture being mixed in the presence of the curing agent in step (b);
   wherein the lignin is selected from one or combinations of: fractionated lignin, depolymerized lignin, Kraft lignoboost lignin, a solvent-extracted fraction of depolymerized lignin, and a solvent-extracted fraction of Kraft lignoboost lignin;
   wherein the one or more acids derived from epoxidized vegetable oil(s) are represented by the general formula

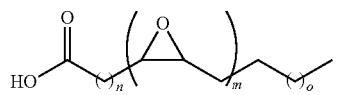

and the one or more esters derived from epoxidized vegetable oil(s) are represented by the general formula

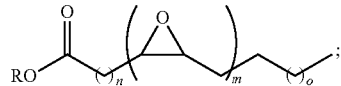

and
   wherein:
   R is hydrogen or any linear or branched alkyl chain of up to 6 carbon atoms;
   n=7, 9, or 11;
   m=1, 2, or 3;
   o=1 to 14.

2. The process according to claim 1, wherein step (b) comprises:
   (b)(i) mixing the reactive mixture in the presence of the curing agent; and
   (b)(ii) curing the reactive mixture to form the epoxy resin.

3. The process according to claim 1, wherein step (b) comprises:
   (b)(i) mixing the reactive mixture at a temperature of at least 10° C. for at least one minute; and
   (b)(ii) curing the reactive mixture in the presence of the curing agent to form the epoxy resin.

4. The process according to claim 3, wherein additional epoxidized vegetable oil and/or a second epoxy compound is added after performing the mixing step (b)(i) and before curing the reactive mixture.

5. The process of claim 3, wherein the reactive mixture is mixed at a temperature of at least 20° C. for at least 5 minutes.

6. The process according to claim 1, wherein a solvent is added in step (a), and wherein the solvent is evaporated during or after mixing.

7. The process according to claim 1, wherein a curing time is at least 1 hour and a curing temperature is at least 50° C.

8. The process according to claim 1, wherein a weight ratio of the lignin to the epoxidized vegetable oil is from 0.01:1 to 5:1.

9. The process according to claim 1, wherein the one or more acids and/or esters derived from epoxidized vegetable oil are derived from epoxidized linseed oil or epoxidized soybean oil or a mixture of epoxidized linseed oil and epoxidized soybean oil.

10. The process according to claim 1, wherein the curing agent is a diamine, a polyamine, a diacid or a triacid, an anhydride, a diol, or polyol.

11. The process according to claim 1, wherein a ratio of the curing agent to the one or more acids and/or esters derived from epoxidized vegetable oil is from 0.2:1 to 5:1, as calculated by amine/acid/anhydride/alcohol equivalent weight: epoxy equivalent weight.

12. An epoxy resin, produced by the process according to claim 1.

13. The epoxy resin according to claim 12, further comprising additives and/or fillers.

14. The process of claim 1, further comprising using the epoxy resin to produce composites, dispersions, lamination materials, rubbery materials, fiber-reinforced materials, electronic materials, aerospace materials, biomedical applications, adhesives, paints, or coatings.

15. The process of claim 1, further providing a catalyst in step (a) to form the reactive mixture.

16. The process according to claim 1, wherein the fractionated lignin is derived from alkaline delignification, acid delignification, reductive catalytic fractionation, ionic-liquid dissolution, ionosolv pulping fractionation and combinations thereof,
wherein the depolymerized lignin is derived from reductive depolymerization, oxidative depolymerization, base-catalyzed depolymerization, acid-catalyzed depolymerization, solvolytic depolymerization, electrochemical depolymerization, thermal depolymerization and combinations thereof, and
wherein the solvent-extracted fraction of depolymerized lignin is a solvent-extracted fraction of base-catalyzed depolymerized lignin.

17. The process according to claim 1, wherein the curing agent is different from the lignin.

18. A process for the production of an epoxy resin, the process comprising:
directly mixing a solvent, lignin, and one or a combination of: one or more acids derived from epoxidized vegetable oil(s) and one or more esters derived from epoxidized vegetable oil(s) to form a reactive mixture; and
mixing and curing the reactive mixture in the presence of a curing agent to form the epoxy resin;
wherein the lignin is selected from one or combinations of: fractionated lignin, depolymerized lignin, Kraft lionoboost lignin, a solvent-extracted fraction of depolymerized lignin, and a solvent-extracted fraction of Kraft lionoboost lignin;
wherein the solvent is evaporated during or after mixing and before adding the curing agent, after adding the curing agent and before the curing, or during the curing;
wherein the one or more acids derived from epoxidized vegetable oil(s) are represented by the general formula

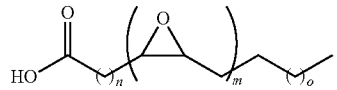

and the one or more esters derived from epoxidized vegetable oil(s) are represented by the general formula

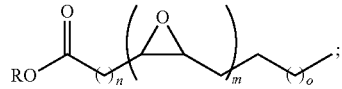

and
wherein:
R is hydrogen or any linear or branched alkyl chain of up to 6 carbon atoms;
n=7, 9, or 11;
m=1, 2, or 3;
o=1 to 14.

19. The process according to claim 18, wherein a weight ratio of the lignin to the epoxidized vegetable oil is from 0.01:1 to 5:1.

20. The process according to claim 18, wherein the one or more acids and/or esters derived from epoxidized vegetable oil are derived from epoxidized linseed oil or epoxidized soybean oil or a mixture of epoxidized linseed oil and epoxidized soybean oil.

* * * * *